(12) United States Patent
Liu

(10) Patent No.: US 10,855,324 B1
(45) Date of Patent: Dec. 1, 2020

(54) VACUUM SCREEN PROTECTOR ATTACHING MACHINE

(71) Applicant: Wing Tak Lee Silicone Rubber Technology (Shenzhen) Co., Ltd., Shenzhen (CN)

(72) Inventor: Tak Nam Liu, Shenzhen (CN)

( * ) Notice: Subject to any disclaimer, the term of this patent is extended or adjusted under 35 U.S.C. 154(b) by 0 days.

(21) Appl. No.: 16/846,464

(22) Filed: Apr. 13, 2020

(30) Foreign Application Priority Data

Dec. 16, 2019 (CN) .................... 2019 2 2263656 U

(51) Int. Cl.
*H04M 1/00* (2006.01)
*H04B 1/3888* (2015.01)

(52) U.S. Cl.
CPC ................................. *H04B 1/3888* (2013.01)

(58) Field of Classification Search
CPC .............................. H04B 1/3888; H04M 1/00
USPC ..................................................... 455/575.8
See application file for complete search history.

(56) References Cited

U.S. PATENT DOCUMENTS

| | | | |
|---|---|---|---|
| 10,730,278 B1* | 8/2020 | Zeng | B32B 38/10 |
| 2014/0230988 A1* | 8/2014 | Chou | H05K 13/00 156/60 |
| 2015/0041069 A1* | 2/2015 | Wadsworth | B29C 63/0004 156/535 |
| 2017/0001364 A1* | 1/2017 | MacDonald | B29C 65/7802 |
| 2017/0253014 A1* | 9/2017 | Kleeman | B32B 37/003 |
| 2018/0037016 A1* | 2/2018 | Kim | B29C 63/02 |
| 2018/0222170 A1* | 8/2018 | Patel | B32B 37/18 |
| 2019/0134921 A1* | 5/2019 | Witham | B29C 66/01 |
| 2019/0381775 A1* | 12/2019 | Patel | H04M 1/0266 |

\* cited by examiner

*Primary Examiner* — Sonny Trinh
(74) *Attorney, Agent, or Firm* — KA Filing LLC; Cynthia W. Flanigan

(57) ABSTRACT

The present application provides a vacuum screen protector attaching machine, wherein the vacuum screen protector attaching machine comprises: a base, an air pump, a screen protector attaching section and an air tube; wherein the screen protector attaching section comprises a screen protector attaching cavity and an upper cover, and the upper cover comprises an airbag; the airbag communicates with one end of the air tube, the one end of the air tube is disposed at a center position of the airbag, the other end of the air tube communicates with an air outlet of the air pump, and the air pump is disposed at the interior of the base; the screen protector attaching cavity is further provided with an air hole, and the air hole communicates with an air inlet of the air pump.

3 Claims, 5 Drawing Sheets

VACUUM SCREEN PROTECTOR ATTACHING MACHINE

CROSS REFERENCE TO RELATED APPLICATION

The present application claims priority to Chinese patent application No. 201922263656.3, entitled "VACUUM SCREEN PROTECTOR ATTACHING MACHINE", filed on Dec. 16, 2019, the entire content of which is incorporated herein by reference.

TECHNICAL FIELD

The present application relates to the field of mobile phone accessories, and in particular to a vacuum screen protector attaching machine.

BACKGROUND

Screen protectors are divided into mobile phone screen protector and mobile phone body protector according to the application; are divided into anti-peeping screen protector (mirror screen protector), anti-scratch mobile phone screen protector, anti-scratch mobile phone body protector and decorating mobile phone body protector according to the function; are divided into transparent screen protector, color pearl screen protector and colored pearlescent screen protector according to the material; and are divided into adhesive screen protector attaching, electrostatic screen protector attaching, etc. according to the principle of applying or installing the screen protector, the screen protector has brought great convenience to people, the fashionistas can decorate mobile phones by choosing their favorite patterns, say goodbye to the monotonous colors and highlight the personalized style, giving a new visual impact; the mobile phone screen is protected by a formal screen protector, which not only protects the screen from scratches and grease, but also reduces eyestrain when the owner using the mobile phone; an increasing number of people are putting the mobile phone in their pockets, and everyone is confused about dust entering the keyboard and screen of mobile phone, these problems can be effectively solved through the mobile phone body protector and mobile phone screen protector.

The existing screen protector is installed manually, the level of attaching a screen protector depends on the proficiency of person attaching the screen protector, the automatic screen protector attaching device cannot effectively attach the screen protector, causing the formation of air bubbles and reducing the quality of attaching the screen protector.

SUMMARY

The embodiment of the present application provides a smart vacuum screen protector attaching machine, the structure of which enables it to attach the screen protector through the change of air pressure, thereby avoiding the appearance of air bubbles, and improving the quality of attaching the screen protector.

The first embodiment of the present application provides a vacuum screen protector attaching machine, comprising:
a base, an air pump, a screen protector attaching section and an air tube;

wherein the screen protector attaching section comprises a screen protector attaching cavity and an upper cover, and the upper cover comprises an airbag;

the airbag communicates with one end of the air tube, the one end of the air tube is disposed at a center position of the airbag, the other end of the air tube communicates with an air outlet of the air pump, and the air pump is disposed at the interior of the base;

the screen protector attaching cavity is further provided with an air hole, and the air hole communicates with an air inlet of the air pump.

Alternatively, the interior of the airbag is further provided with a heat insulation plate and a temperature control plate.

Alternatively, the outer surface of the airbag is made of sheepskin, cowhide or artificial leather.

The implementation of the embodiment of the present application has the following beneficial effects:

it can be seen that, the technical solution provided in the present application is that after positioning the screen protector to be attached and the mobile phone, place the mobile phone to be attached with the screen protector into the screen protector attaching cavity, and then close the upper cover, in this way, the screen protector attaching cavity is isolated from the air, at this time, the air pressure of the screen protector attaching cavity is normal pressure, at this time, the air pump works, and the air of the screen protector attaching cavity is sucked out through the air hole, so that the air pressure of the screen protector attaching cavity decreases, and the air pump sucks the air into the airbag, the airbag becomes larger, so that the middle part of the airbag will be pressed against the middle part of the mobile phone, and the screen protector to be attached will be attached to the mobile phone, as the amount of air intake increases, the airbag becomes larger and larger, and can directly wrap the screen protector to be attached to the mobile phone, since the technical solution of the present application is attaching from the middle part of the screen protector to be attached, the occurrence of air bubbles can be avoided, in addition, the technical solution of the present application is attaching through the change of air pressure, due to the strong fluidity of the gas, the pressure is relatively uniform, which makes the pressure of attaching screen protector uniform, and avoids directly crushing the mobile phone, thus improving the quality of attaching the screen protector and user experience.

BRIEF DESCRIPTION OF THE DRAWINGS

In order to more clearly illustrate the technical solutions in the embodiments of the present application, drawings used in the description of the embodiments will be briefly described below, obviously, the drawings in the following description are some embodiments of the present application, those of ordinary skill in the art can also obtain other drawings based on these drawings without any creative efforts.

DESCRIPTION OF THE EMBODIMENTS

The technical solution in the embodiments of the present application is clearly and completely described below with reference to the accompanying drawings in the embodiments of the present application, obviously, the described embodiments are a part of the embodiments of the present application, rather than all of the embodiments. All other embodiments obtained by those of ordinary skill in the art based on the embodiments of the present application without paying any creative efforts are within the scope of protection of the present application.

The terms, such as "first", "second", "third", "fourth", etc., in the specification, claims and the accompanying drawings of the present application are used to distinguish different objects, and are not intended to describe a specific order. Furthermore, the terms "comprise", "have" and any variations thereof are intended to cover a non-exclusive inclusion. For example, a process, method, system, product, or device that comprises a series of steps or units is not limited to the listed steps or units, but alternatively comprises steps or units that are not listed, or alternatively comprises other steps or units inherent to these processes, methods, products or devices.

References to "an embodiment" herein mean that a particular feature, structure, or characteristic described in connection with the embodiments can be included in at least one embodiment of the present application. The appearances of the phrase in various places in the specification are not necessarily referring to the same embodiments, and are not exclusive or alternative embodiments that are mutually exclusive from other embodiments. Those skilled in the art will explicitly and implicitly understand that the embodiments described herein can be combined with other embodiments.

Figure 1:
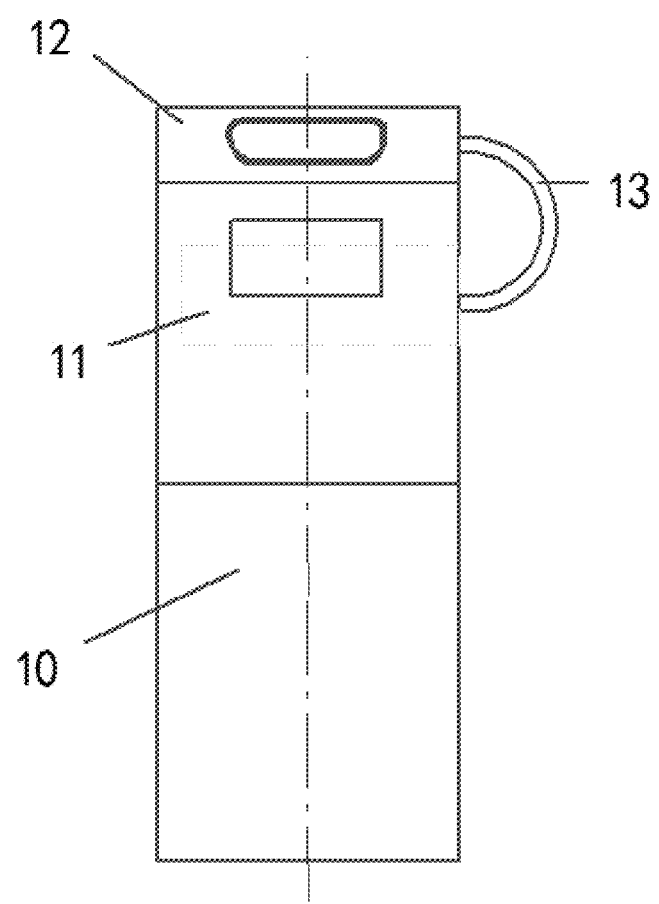
FIG. 1 is a schematic structural diagram of a vacuum screen protector attaching machine according to an embodiment of the present application.
Figure 2:
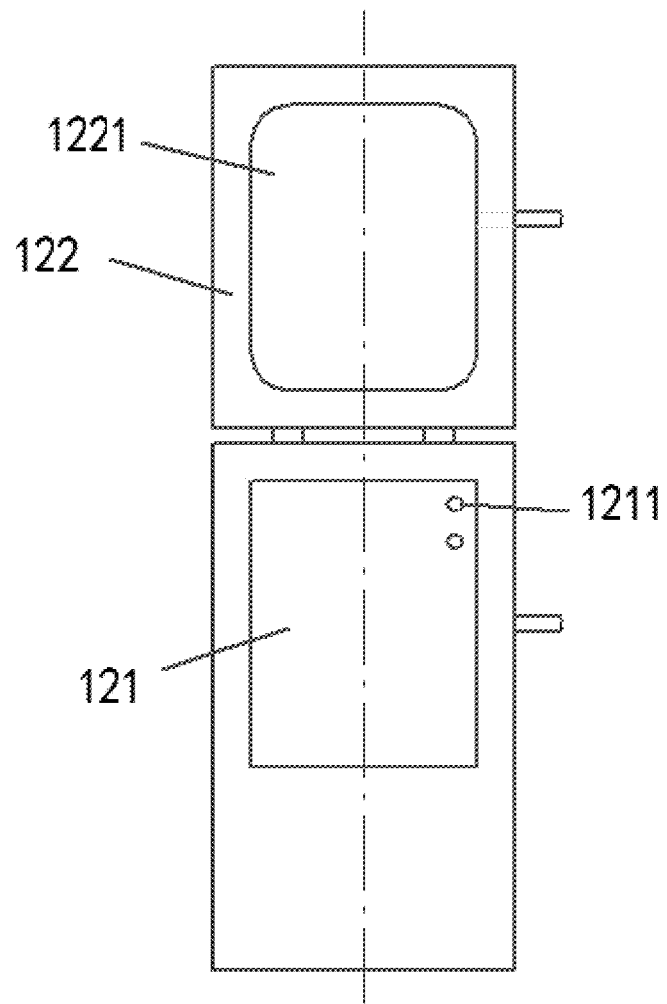
FIG. 2 is another schematic structural diagram of a vacuum screen protector attaching machine provided by the present application.

Referring to FIG. 1 and FIG. 2, the present application provides a vacuum screen protector attaching machine, as shown in FIG. 1 and FIG. 2, the vacuum screen protector attaching machine comprises: a base 10, an air pump 11, a screen protector attaching section 12 and an air tube 13;

wherein the screen protector attaching section 12 comprises a screen protector attaching cavity 121 and an upper cover 122, and the upper cover 122 comprises an airbag 1221, the airbag 1221 communicates with one end of the air tube 13, the one end of the air tube 13 is disposed at a center position of the airbag 1221, the other end of the air tube 13 communicates with an air outlet of the air pump 11, and the air pump 11 is disposed at the interior of the base 10;

the screen protector attaching cavity 121 is further provided with an air hole 1211, and the air hole 1211 communicates with an air inlet of the air pump 11.

Referring to FIG. 1 and FIG. 2, the working principle of the vacuum screen protector attaching machine provided in the present application is that after positioning the screen protector to be attached and the mobile phone, place the mobile phone to be attached with the screen protector into the screen protector attaching cavity 121, and then close the upper cover 122, in this way, the screen protector attaching cavity 121 is isolated from the air, at this time, the air pressure of the screen protector attaching cavity 121 is normal pressure, at this time, the air pump 11 works, and the air of the screen protector attaching cavity 121 is sucked out through the air hole 1211, so that the air pressure of the screen protector attaching cavity 121 decreases, and the air pump 11 sucks the air into the airbag 1221, the airbag 1221 becomes larger, so that the middle part of the airbag 1221 will be pressed against the middle part of the mobile phone, and the screen protector to be attached will be attached to the mobile phone, as the amount of air intake increases, the airbag 1221 becomes larger and larger, and can directly wrap the screen protector to be attached to the mobile phone, since the technical solution of the present application is attaching from the middle part of the screen protector to be attached, the occurrence of air bubbles can be avoided, in addition, the technical solution of the present application is attaching through the change of air pressure, due to the strong fluidity of the gas, the pressure is relatively uniform, which makes the pressure of attaching the screen protector uniform, and avoids directly crushing the mobile phone, thus improving the quality of attaching the screen protector and user experience.

Figure 3:
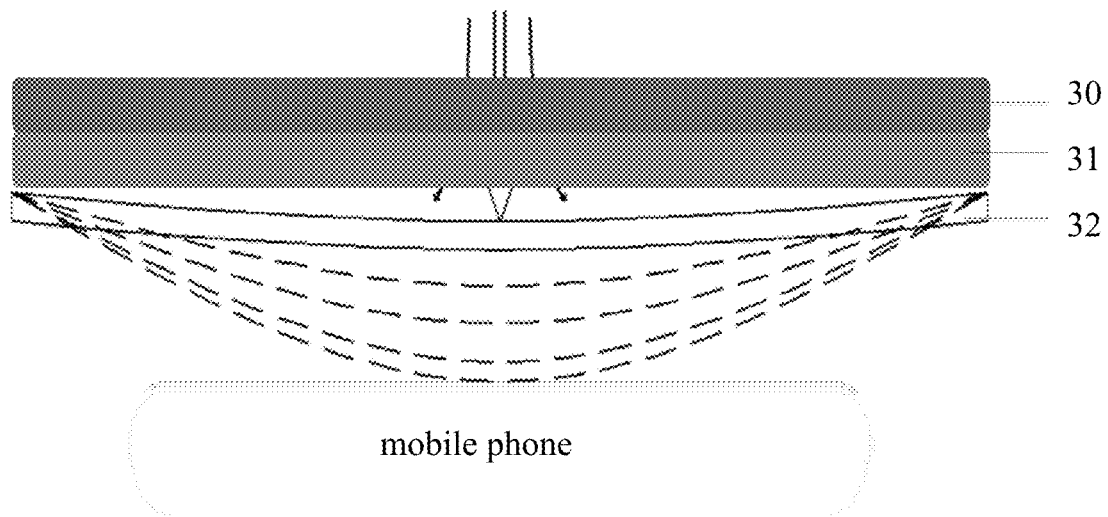
FIG. 3 is a schematic diagram of an initial stage of screen protector attaching process provided by the present application.
Figure 4:
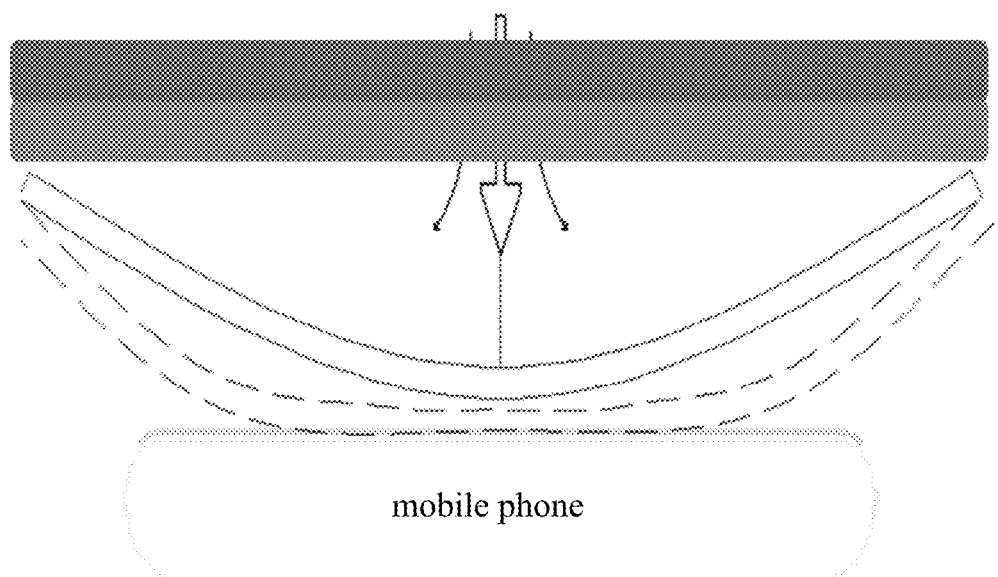
FIG. 4 is a schematic diagram of a middle stage of screen protector attaching process provided by the present application.
Figure 5:
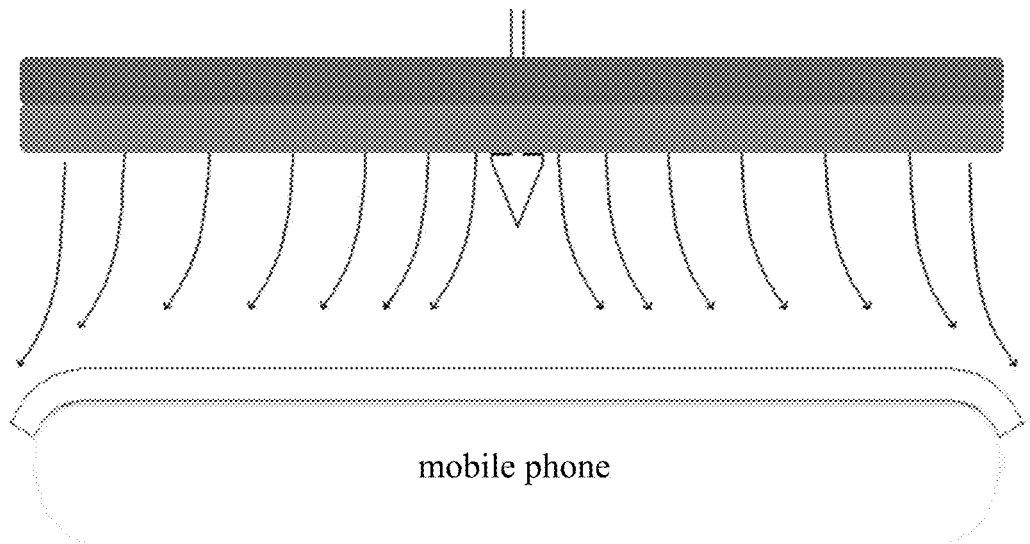
FIG. 5 is a schematic diagram of a completion stage of screen protector attaching process provided by the present application.
Figure 6:
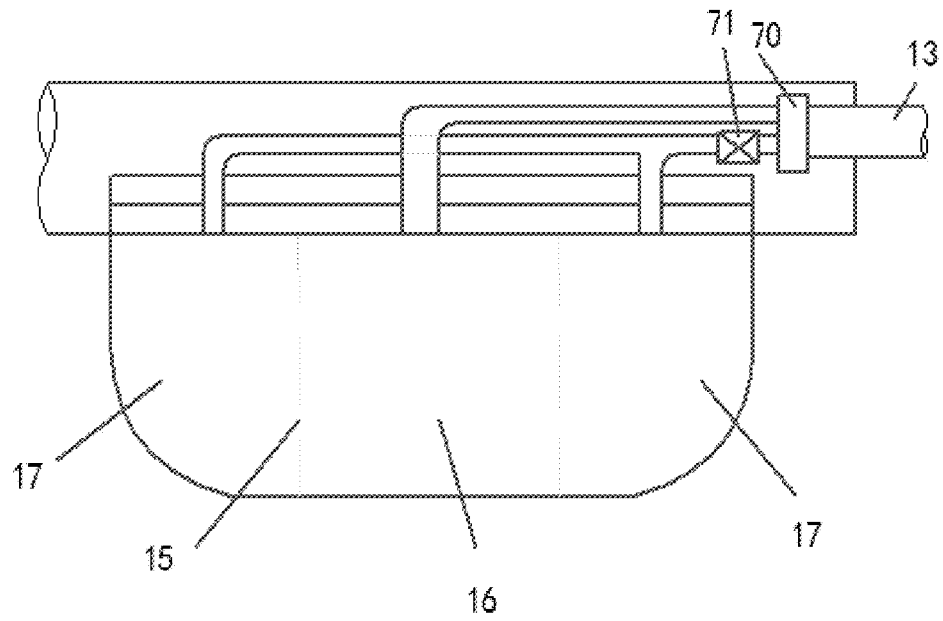
FIG. 6 is a schematic communication diagram of an air tube provided by the present application.

Referring to FIG. 3, FIG. 4 and FIG. 5, which are the schematic diagrams of screen protector attaching process in the technical solution of the present application. As shown in FIG. 3, FIG. 3 is a schematic diagram of an initial stage of screen protector attaching process, for the initial stage, since the one end of the air tube 13 is disposed at the center position of the airbag 1221, the air blows the middle part of the airbag 1221 to make the middle part attach to the screen protector, referring to FIG. 4, FIG. 4 is a schematic diagram of a middle stage of screen protector attaching process, for the middle stage, the airbag 1221 slowly squeezes from the middle part to both sides, and attaches to the screen protector on both sides, as shown in FIG. 5, FIG. 5 is a schematic diagram of a completion stage of screen protector attaching process, for the completion stage, the airbag 1221 fully unfolds and slowly wraps the curved surfaces on both sides (such as 3D curved surfaces), in this way the screen protector is completely attached to the mobile phone screen, so that it is able to compatible with all types of mobile phones, and has the advantage of wide application range.

Alternatively, the interior of the above-mentioned airbag 1221 is further provided with a heat insulation plate 30 and a temperature control plate 31, wherein the temperature control plate 31 is able to heat the airbag to make the screen protector attached to the mobile phone screen better.

The outer surface 32 of the airbag 1221 is made of sheepskin, cowhide, artificial leather, or the like. These materials can make the screen protector attached to the mobile phone screen better.

Alternatively, the above-mentioned airbag 1221 further comprises two diaphragms 15, the two diaphragms 15 divide the airbag 1221 into a middle cavity 16 and two side cavities 17, one end of the air tube 13 is connected to the common end of a two-way valve 70, and the first tapping end of the two-way valve 70 communicates with the middle cavity 16, the second tapping end of the two-way valve 70 communicates with the two side cavities 17 after the second tapping end of the two-way valve 70 connects to a solenoid valve 71, the solenoid valve 71 is used to open and close after delaying a set time.

The main purpose of the above technical features is to make the screen protector fit for the mobile phone screen with a curved surface better. Referring to FIG. 3 to FIG. 6, at the stage shown in FIG. 3 and FIG. 4, only the outer surface of the middle cavity 16 needs to attach to the screen protector, at this time, the side cavity is not ventilated, so the outer surface of the side cavity 17 is not tightly attached to the screen protector, when reaching the stage shown in FIG. 5, i.e. after delaying a set time, the solenoid valve 71 opens and closes, and the two side cavities 17 ventilate, so that the pressure on the edge of the screen increases, and the screen protector with a curved surface is attached, so the structure of the vacuum screen protector attaching machine can make the screen protector with a curved surface attached to the mobile phone screen better.

Figure 7:
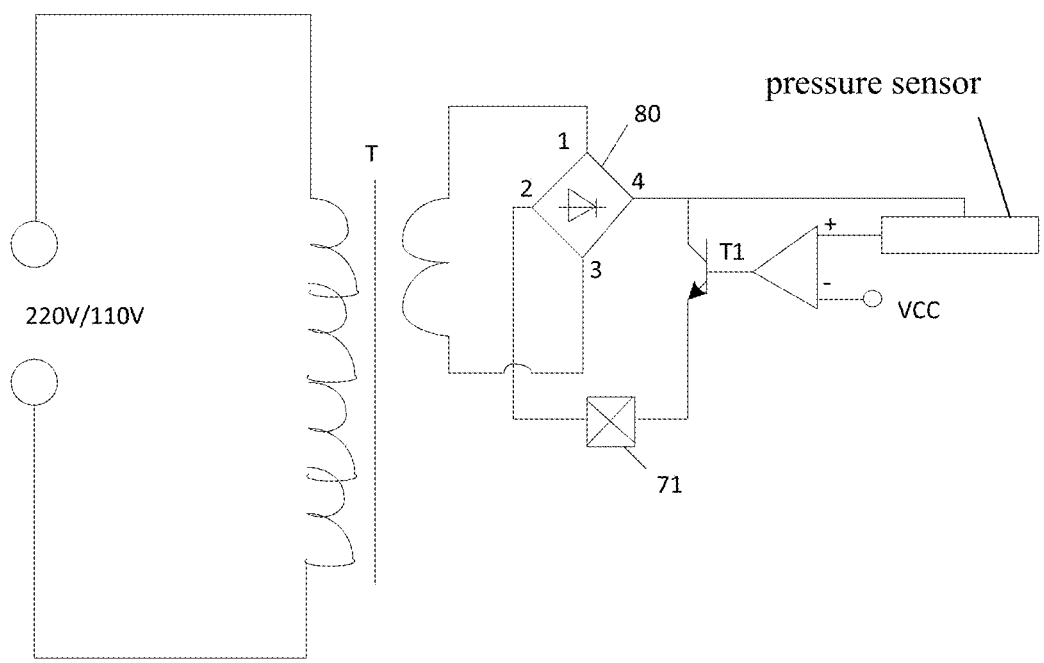
FIG. 7 is a schematic diagram of a delay control circuit provided by the present application.

Alternatively, the above-mentioned vacuum screen protector attaching machine may further comprise a delay control circuit, as shown in FIG. 7, the delay control circuit comprises: a power supply, a transformer T, a transistor T1, a bridge rectifier circuit 80, a solenoid valve 71 and a pressure sensor; wherein the power supply is connected to both ends of the primary side of the transformer T, one end of the secondary side of the transformer T is connected to the port 1 of the bridge rectifier circuit 80, and the other end of the secondary side of the transformer T is connected to the port 3 of the bridge rectifier circuit 80, the port 4 of the bridge rectifier circuit 80 is connected to the collector of the transistor T1, the emitter of the transistor T1 is connected to one end of the solenoid valve 71, the other end of the solenoid valve 71 is connected to the port 2 of the bridge rectifier circuit, and the base of the transistor T1 is connected to the output of a comparator, the forward input of the comparator is connected to the output of the pressure sensor, and the reverse input of the comparator is connected to a voltage source VCC, the pressure sensor is arranged in the middle cavity 16, and one end of the pressure sensor is connected to the port 4 of the bridge rectifier circuit 80, the other end thereof is grounded.

The working principle is that when the vacuum screen protector attaching machine is powered on, the pressure sensor is energized to work after the power supply is transformed by transformer and is changed by the bridge rectifier circuit, at this time, the pressure in the middle cavity 16 is relatively small, so the voltage value output by the pressure sensor is relatively small, the pressure in the middle cavity 16 increases over time, and the voltage value output by the pressure sensor becomes larger, when it is greater than VCC, the output of the comparator outputs a high level, and the solenoid valve is energized to open and close, so that the side cavity 17 is inflated to start to work.

The embodiments of the present application have been described in detail above, specific examples are used in the present specification to explain the principles and implementation mode of the present application, the descriptions of the above embodiments are only used to help understand the method and core ideas of the present application; meanwhile, persons of ordinary skill in the art may change the specific implementation and application scope according to the idea of the present application, in summary, the content of the present specification should not be construed as a limitation on the present application.

What is claimed is:

1. A vacuum screen protector attaching machine comprising: a base, an air pump, a screen protector attaching section and an air tube;
   wherein the screen protector attaching section comprises a screen protector attaching cavity and an upper cover, and the upper cover comprises an airbag;
   the airbag communicates with one end of the air tube, the one end of the air tube is disposed at a center position of the airbag, the other end of the air tube communicates with an air outlet of the air pump, and the air pump is disposed at the interior of the base;
   the screen protector attaching cavity is further provided with an air hole, and the air hole communicates with an air inlet of the air pump.

2. The vacuum screen protector attaching machine of claim 1, wherein the interior of the airbag is further provided with a heat insulation plate and a temperature control plate.

3. The vacuum screen protector attaching machine of claim 1, wherein the outer surface of the airbag is made of sheepskin, cowhide, artificial leather, silicone leather or rubber leather.

* * * * *